United States Patent
Valentino

[19]

[11] Patent Number: 5,912,616
[45] Date of Patent: Jun. 15, 1999

[54] JACKKNIFE WARNING SYSTEM FOR TRAILERED VEHICLE

[76] Inventor: Joseph A. Valentino, 1924 Parker Ave., Holmes, Pa. 19043

[21] Appl. No.: 08/887,275

[22] Filed: Jul. 2, 1997

Related U.S. Application Data

[63] Continuation-in-part of application No. 08/826,392, Apr. 9, 1997, which is a continuation-in-part of application No. 08/385,448, Feb. 8, 1995, Pat. No. 5,627,688.

[51] Int. Cl.⁶ ........................................ B60Q 1/00
[52] U.S. Cl. ........................... 340/431; 340/429; 340/440; 280/432
[58] Field of Search .................... 340/431, 429, 340/440; 280/432

[56] References Cited

U.S. PATENT DOCUMENTS

| | | | |
|---|---|---|---|
| 3,103,201 | 9/1963 | Owen | 116/28 |
| 3,166,630 | 1/1965 | Esslinger . | |
| 3,208,343 | 9/1965 | Prochnow . | |
| 3,469,901 | 9/1969 | Cook et al. . | |
| 3,563,639 | 2/1971 | Bowler . | |
| 3,749,480 | 7/1973 | De Witt et al. . | |
| 3,950,080 | 4/1976 | McKee et al. . | |
| 4,040,006 | 8/1977 | Kimmel | 340/431 |
| 4,341,395 | 7/1982 | Miller et al. | 340/431 |
| 4,585,248 | 4/1986 | Miller et al. | 280/432 |
| 4,609,265 | 9/1986 | McKee et al. . | |
| 4,679,158 | 7/1987 | Tate . | |
| 4,820,032 | 4/1989 | Thompson, Jr. . | |
| 5,001,639 | 3/1991 | Breen | 364/426.01 |
| 5,032,821 | 7/1991 | Domanico et al. | 340/440 |
| 5,056,905 | 10/1991 | Jensen . | |
| 5,132,851 | 7/1992 | Bomar et al. . | |
| 5,196,965 | 3/1993 | Lang et al. . | |
| 5,249,083 | 9/1993 | Doughtie et al. . | |
| 5,259,640 | 11/1993 | Mackey | 280/432 |
| 5,627,688 | 5/1997 | Valentino | 359/843 |
| 5,684,647 | 11/1997 | Rouleau | 359/843 |
| 5,690,347 | 11/1997 | Juergens et al. | 280/432 |

FOREIGN PATENT DOCUMENTS

| | | |
|---|---|---|
| 0 094 817 | 5/1983 | European Pat. Off. . |
| 2 601 634 | 7/1986 | European Pat. Off. . |
| WO 86/05451 | 9/1986 | WIPO . |
| WO 92/06883 | 4/1992 | WIPO . |

OTHER PUBLICATIONS

ARCM Corp. "Jackknife Warning Alarm".
A Study of Commercial Motor Vehicle Electronics Based Rear and Side Object Detection Systems, DOT HS 808 080 (Jan. 1994).

*Primary Examiner*—Edward Lefkowitz
*Attorney, Agent, or Firm*—Finnegan, Henderson, Farabow, Garrett, & Dunner, L.L.P.

[57] ABSTRACT

A jackknife warning system for a trailered vehicle. A rotation sensor, mounted to a chassis of a tractor, engages an underside of a semi-detached trailer and senses rotation of the trailer with respect to the tractor. A pressure sensor senses pressure applied to a set of brakes for the vehicle. When rotation of the trailer reaches a first setpoint, and pressure applied to the brakes reaches a second setpoint, an alarm is emitted. The alarm can either be a right alarm or a left alarm, depending on if the vehicle is jackknifing to the right or to the left. The brake pressure setpoint can be adjusted by the driver based on the load being carried or on road conditions.

16 Claims, 7 Drawing Sheets

JACKKNIFE WARNING SYSTEM FOR TRAILERED VEHICLE

This is a continuation in part of U.S. patent application Ser. No. 08/826,392, filed Apr. 9, 1997, which in turn was a CIP of Ser. No. 385,448, now U.S. Pat. No. 5,627,688, filed Feb. 8, 1995, and claims priority therefrom under 35 U.S.C. § 120.

BACKGROUND OF THE INVENTION

1. Field of the Invention

The present application relates to a warning system. More particularly, the present invention relates to a jackknife warning system for a trailered vehicle.

2. Description of the Related Art

A common problem experienced by large trucks including a tractor and a semi-detached trailer is the tendency to "jackknife" as a result of sudden braking on gravel, or on a wet, or icy road surface. In other words, the trailer pivots excessively with respect to the tractor, causing the driver to lose control of the vehicle. This condition is usually caused by an excessive application of brake pressure while the vehicle is subject to road conditions that provide poor traction.

It would be advantageous to provide the driver of this type of trailered vehicle with an early warning system to alert him of conditions indicating that a jackknife is imminent, so that he may reduce brake pressure or take some other action to prevent the jackknife from occurring. No such system is believed to be currently available.

SUMMARY OF THE INVENTION

The present invention was made to correct one or more of the shortcomings experienced by the related art.

In accordance with the invention, a jackknife warning system for a vehicle having a tractor and a trailer includes a trailer-turning sensor, attachable to a chassis of the tractor and engageable with the trailer, capable of sensing rotation of the trailer with respect to the tractor; a pressure sensor sensing a pressure applied to a set of brakes of the vehicle; a controller programmed to generate an alarm signal when rotation of the trailer with respect to the tractor reaches a first setpoint; and an alarm device for emitting an alarm in response to the alarm signal.

In another aspect of the invention, a jackknife warning system for a vehicle having a tractor and a trailer includes a trailer-turning sensor, attachable to a chassis of the tractor and engageable with the trailer, capable of sensing rotation of the trailer with respect to the tractor; a pressure sensor sensing a pressure applied to a set of brakes for the vehicle; a controller programmed to generate an alarm signal when rotation of the trailer with respect to the tractor reaches a first setpoint, and the pressure applied to the brakes reaches a second setpoint; and an alarm device for emitting an alarm in response to the alarm signal.

It is preferred that the jackknife warning system provide the driver with either a right jackknife alarm signal or a left jackknife alarm signal, depending on which direction the vehicle is jackknifing.

Additional advantages of the invention will be set forth in the description which follows, and in part will be apparent from the description, or may be learned by practice of the invention. The advantages of the invention may be realized and obtained by means of the combinations particularly pointed out in the attached claims.

BRIEF DESCRIPTION OF THE DRAWINGS

The accompanying drawings, which are incorporated in and constitute a part of the specification, illustrate a preferred embodiment of the invention. Together with the general description given above and the detailed description of the preferred embodiments given below, the drawings serve to explain the principles of the invention.

DESCRIPTION OF THE PREFERRED EMBODIMENTS

Figure 1:
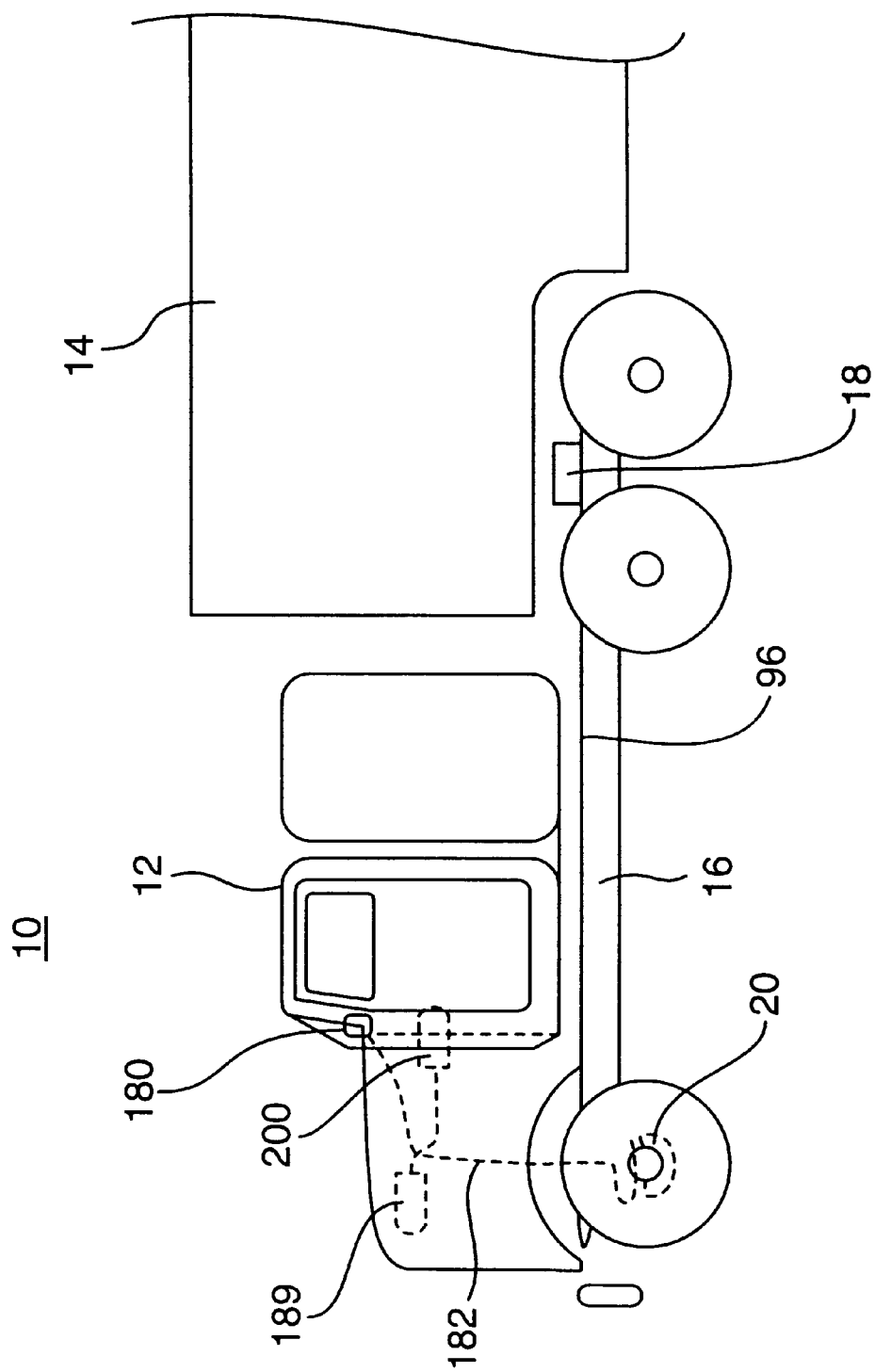
FIG. 1 is a side view of a tractor and a trailer, depicting locations of portions of the jackknife warning system of the present invention.

A jackknife warning system is provided for a vehicle including a tractor and a trailer. As shown in FIG. 1, a vehicle 10 includes a tractor 12 and a detachable trailer 14 (shown in phantom lines). Tractor 12 includes a chassis 16. A "fifth wheel" 18 is attached at a rear position of the chassis 16. Persons familiar with trailered vehicles will recognize that detachable trailer 14 connects to tractor 12 at fifth wheel 18, and that trailer 14 can pivot with respect to tractor 12. Vehicle 10 also includes a set of brakes 20 (shown in phantom) for stopping the vehicle.

In accordance with the invention, a trailer-turning sensor is attachable to the tractor chassis and engageable with the trailer, capable of sensing rotation of the trailer with respect to the tractor. Preferably, the trailer-turning sensor includes a wheel maintained in rolling engagement with an underside of the trailer.

In a first embodiment of the invention, an elongated arm having first and second ends is provided, the first end pivotally mountable to a support on the chassis of the tractor with the arm generally transverse to an axis defined by the tractor and the trailer, the second end supporting a rotatable wheel. As broadly depicted in FIG. 2, a support 40 is attachable at a plurality of positions on the tractor chassis 16. Preferably, support 40 is a steel cross member 42 mountable to channels 29 in the chassis 16 at a number of selected positions in front of fifth wheel 18, using steel hold down clamps 44, bolts 46, and neoprene gaskets 48. Clamps 44 preferably are steel clamps. The use of clamps and bolts to secure cross member 42 to chassis 18 allows the driver to loosen the bolts and move the cross-member 42 to the desired position, depending on the particular trailer being towed. Persons of ordinary skill in the art will recognize that most commercial trailers in the United States have a steel plate with holes in it mounted on the underside of the trailer, approximately 12 inches or 22 inches in front of the fifth wheel 16. The position of the cross member 42 on the chassis therefore should be adjustable as necessary to avoid holes in this plate. Neoprene gaskets 48 allow for variations in chassis surfaces.

Figure 2:
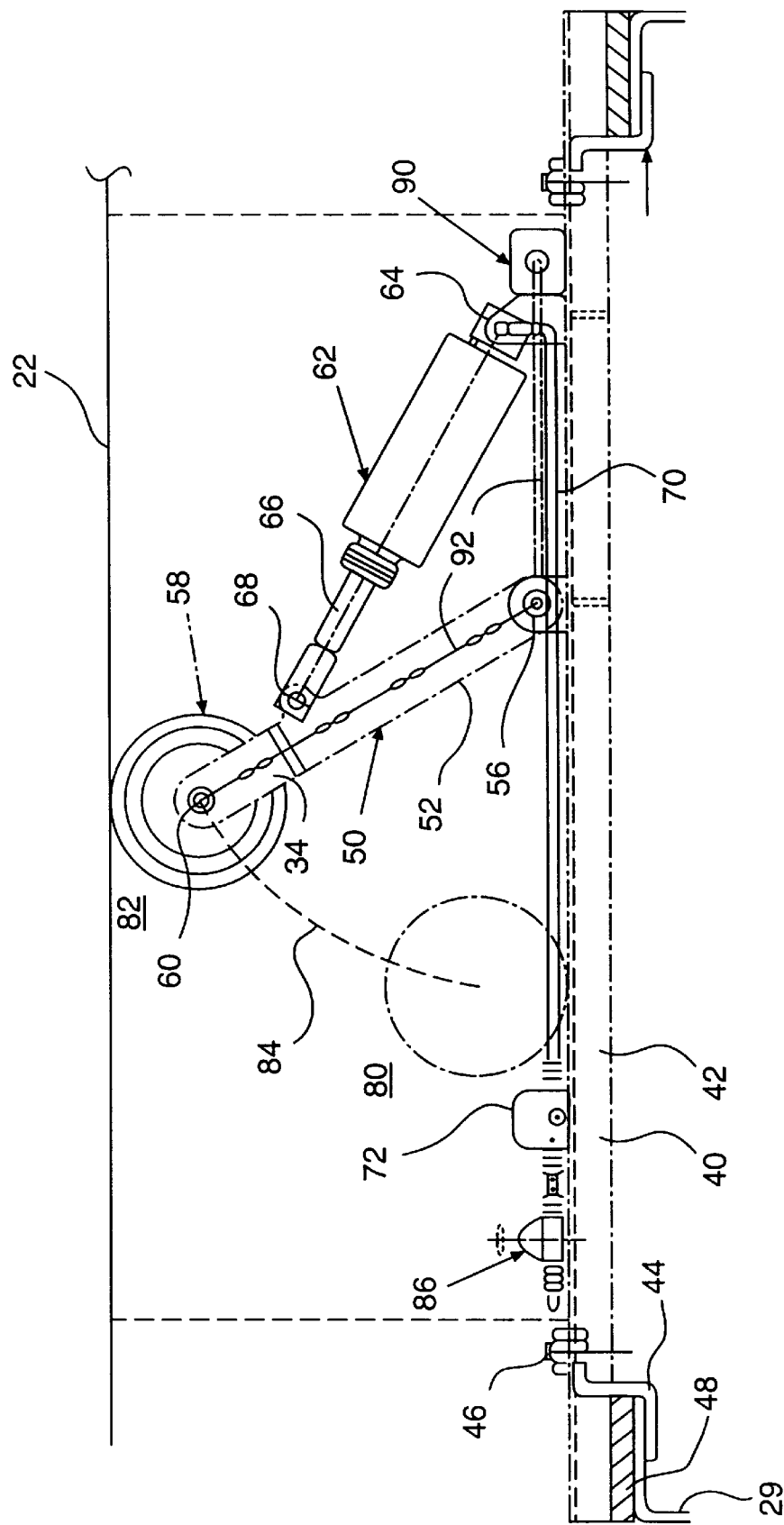
FIG. 2 is a side view of one embodiment of a trailer-turning sensor in accordance with the present invention.

As further broadly depicted in FIG. 2, an elongated control arm 50 has a first end 52 and a second end 54. First end 52 attaches pivotally to support 40 at a pivot point 56. A control wheel 58, preferably including a molded rubber tire having a maximum capacity of 400 psi, is rotatably mounted at a pivot point 60 at second end 54 of control arm 50.

In accordance with the first embodiment of the invention described above, a pivot assembly is provided to pivot the arm from a disengaged position proximate the chassis to an engaged position with the wheel in rolling contact with an underside of the trailer. As broadly depicted in FIG. 2, a cylinder 62, preferably a dual-action pneumatic cylinder, is pivotally connected to support 40 at pivot point 64. A piston rod 66 projects from cylinder 62, and is pivotally connected to control arm 50 at pivot point 68, intermediate first end 52 and second end 54.

As broadly embodied in FIG. 2, pressurized fluid is provided to actuate cylinder 62 via a fluid line 70. Preferably, 15 psig is supplied to cylinder 62 via the fluid line 70. In the preferred embodiment, the pressurized fluid is compressed air, preferably supplied by the vehicle's air compressor 184, via a solenoid control valve 72. This can be the same compressed air used in the vehicle brake system. However, it is within the scope of the invention to provide a separate pneumatic system to operate cylinder 62.

In accordance with the first embodiment of the invention, control arm 50 and cylinder 62 are positioned on support 40 so that when cylinder 62 is pressurized, control arm 50 will be pivoted upward from a disengaged position 80 proximate the chassis, to an engaged position 82 with wheel 58 in rolling contact with the underside surface 22 of trailer 14. Moreover, in accordance with the invention, these components are positioned so that the arc 84 defined by the arm's motion from disengaged position 80 to engaged position 82 is transverse to an axis 32 defined by the aligned tractor and trailer.

It is also preferable that when control arm 50 of the first embodiment is in the engaged position 82, wheel 58 be maintained in substantially continuous rolling contact with the underside 22 of trailer 14. This feature of the invention takes into account normal road conditions, which will cause trailer 14 to move up and down as the vehicle wheels encounter bumps in the road. In order to help maintain this substantially continuous contact, a regulator 86 preferably is provided in fluid line 70 to adjust the pressure in cylinder 62 as necessary to adjust the position of control arm 50 and keep control wheel 58 in contact with trailer 14. Preferably, regulator 86 will operate to maintain substantially constant pressure in cylinder 62.

In accordance with the first embodiment of the invention, a counter is provided, operable to count a number of rotations or partial rotations of the wheel as the trailer pivots with respect to the tractor during a vehicle turn. As broadly depicted herein, and referring to FIG. 2, an electronic counting mechanism 90 is attached to support 42. A rotatable cable 92, preferably a standard flex drive cable, links counting mechanism 90 to control wheel 58. Cable 92 can be, for example, a standard speedometer cable covered with a plastic sheath. As wheel 58 turns in response to a turn of the vehicle and corresponding pivot by the trailer about fifth wheel 18, cable 92 rotates in correspondence. The rotations or partial rotations of cable 92 in turn are converted in counter 90 into electronic pulses. Counter 90 counts these electronic pulses. Counter 90 also can sense whether the vehicle is turning right or left. Counter 90 senses a right turn as positive counts and a left turn as negative counts.

Another option for counting rotations of wheel 58, not shown in the drawings, is to place windows in the wheel 58, and mount a counter with a visual or magnetic scan capability proximate the wheel to count the windows as they rotate past the counter.

The invention is not limited to the use of an elongated control arm and a pivot assembly for pivoting the control arm to an engaged position. Rotation of the trailer is sensed by rotation of control wheel 58 against the bottom surface of the trailer as the trailer turns. Rotations of the control wheel 58 are then counted for later translation into a corresponding degree of trailer rotation. Hence, any structure capable of bringing the control wheel 58 into engagement with the bottom surface of the trailer falls within the scope of the present invention.

Figure 3:
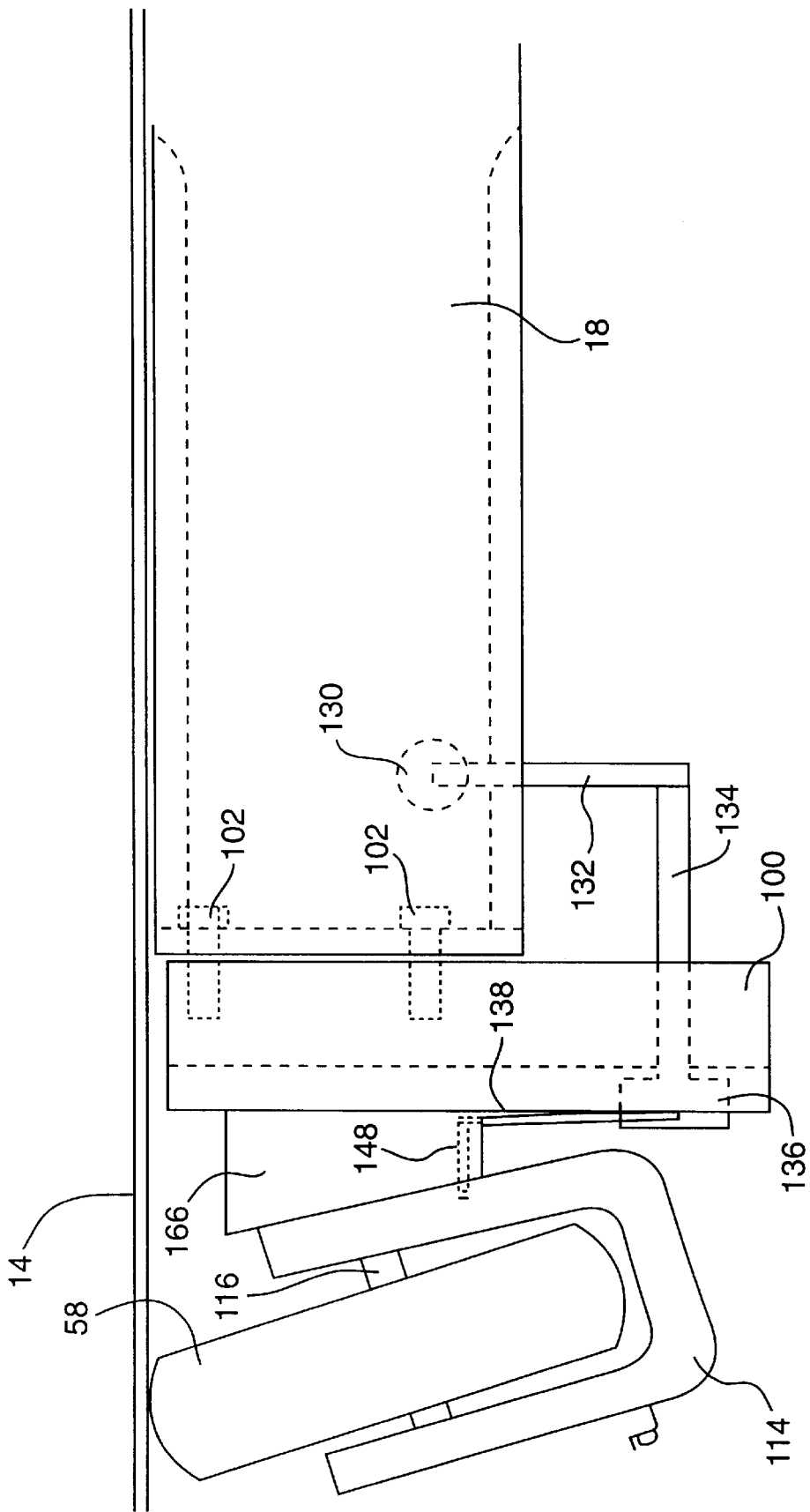
FIG. 3 is a side view of another embodiment of a trailer-turning sensor mounted to the fifth wheel in accordance with the present invention.
Figure 4:
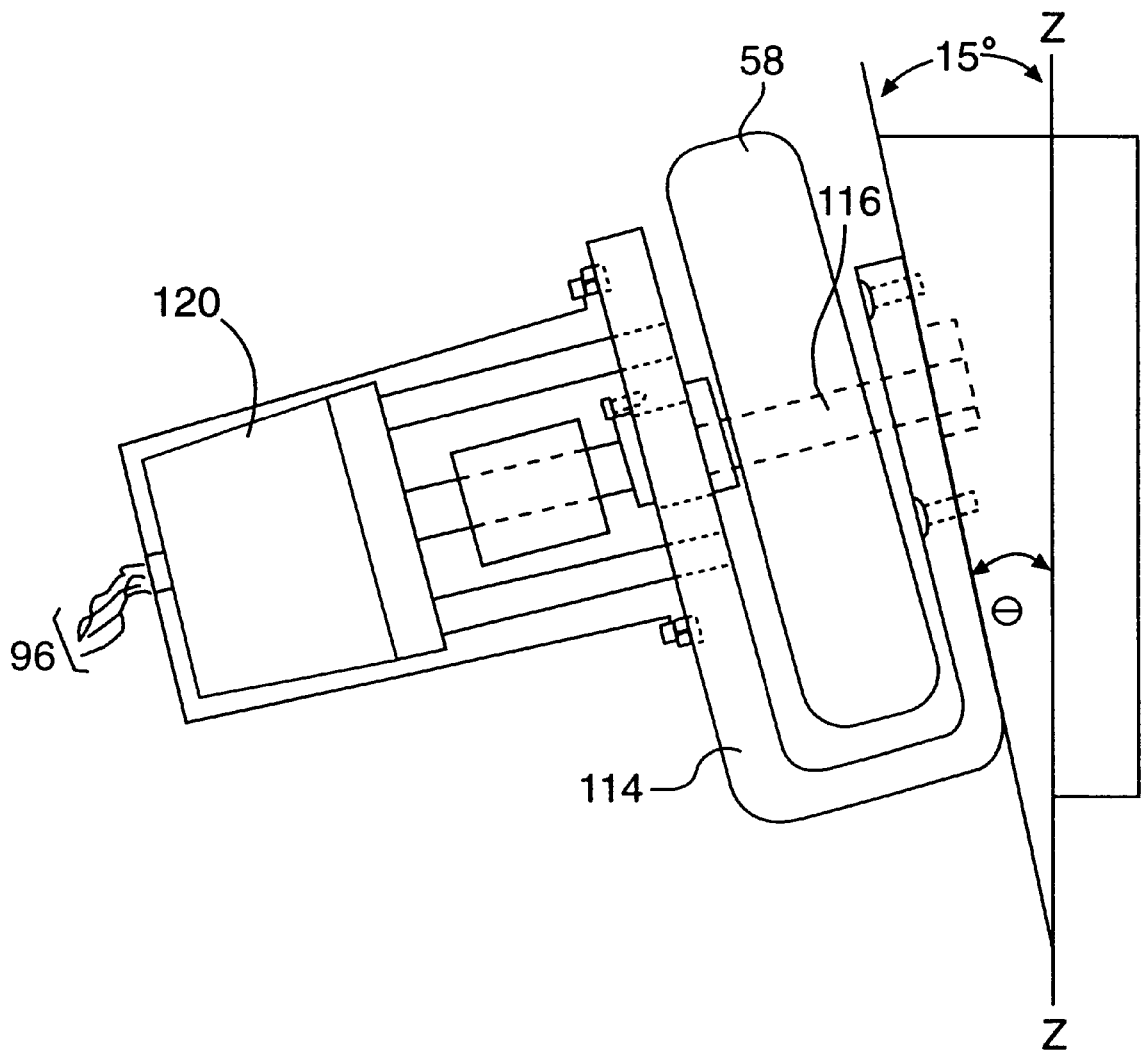
FIG. 4 is a side view of the trailer-turning sensor shown in FIG. 3.
Figure 5:
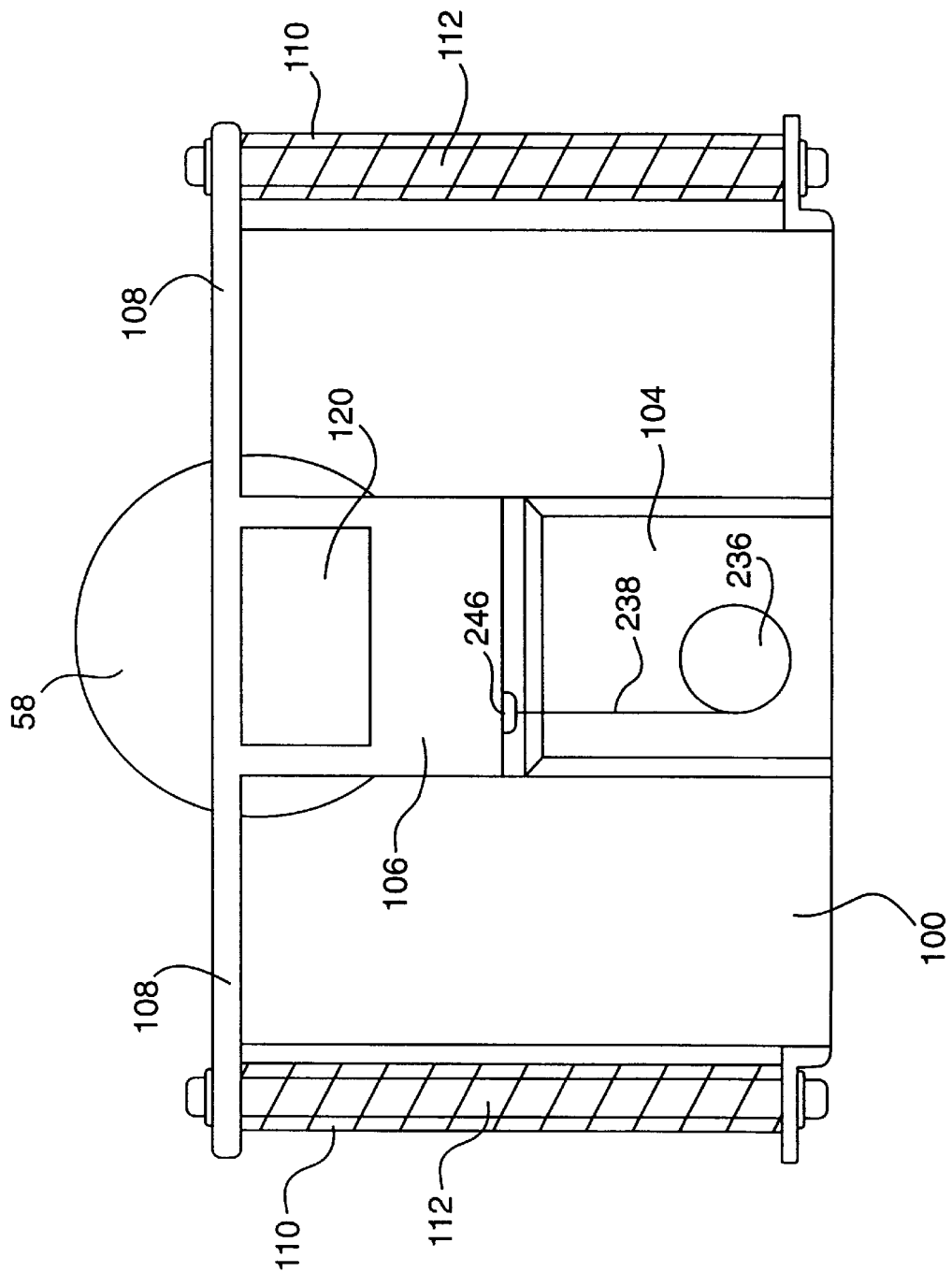
FIG. 5 is a front view of the trailer-turning sensor depicted in FIGS. 3 and 4.

For example, a second embodiment of a structure capable of engaging the control wheel 58 with the bottom surface of the trailer 14 is shown in FIGS. 3–5.

In accordance with the second embodiment of the invention, a mounting block is provided, attachable to the chassis, and having a groove defined therein. As shown in FIG. 3, a mounting block 100 attaches to tractor chassis 16 proximate a rear end of fifth wheel 18. Preferably, mounting bolts 102 attach mounting block 100 directly to fifth wheel 18. In a preferred embodiment, mounting block 102 is an aluminum block, having approximate dimensions of 3"×3½". As shown in FIG. 5, a groove 104 is provided in mounting block 100.

In accordance with the second embodiment of the invention, a control wheel is slidably supported in the groove. As shown in FIGS. 3–5, a slider block 106 slidably engages groove 104. Slider block 106 includes at least one, and preferably two, projecting arms 108. Projecting arms 108, and consequently slider block 106, are biased in an upward direction (as shown in FIG. 5) by coil springs 110 mounted on shafts 112. As shown in FIGS. 3 and 4, a generally U-shaped bracket 114 attaches to slider block 106, the bracket 114 supporting an axle 116. Control wheel 58 is rotatably supported on axle 116.

As noted above, coil springs 110 bias slider block 106 in an upward direction, thereby biasing control wheel 58 upward to an engaged position in contact with the bottom surface of trailer 14. The spring force of coil springs 110 should be adequate to maintain the control wheel 58 in engagement with trailer 14 despite jolts caused by irregularities in the road surface.

As embodied in FIGS. 3–5, control wheel 58 is mounted on U-shaped bracket 114 and axle 116 at a preselected angle e with respect to a vertical line z—z drawn between the bottom surface of trailer 14 and the ground. It has been found that because control wheel 58 travels in an arc along the underside of trailer 14 when trailer 14 pivots, control wheel 58 can roll more easily if it is angled with respect to a vertical line, and therefore also with respect to the horizontal bottom surface of the trailer. The preferred angle θ of control wheel 58 with respect to vertical line z—z is 15°. It is further preferred that the edge of control wheel 58, which will contact the underside surface of trailer 14 due to the 15° offset, be chamfered to increase the amount of wheel surface in contact with the trailer.

In accordance with the second embodiment of the invention, a counter is provided, operable to count a number of rotations or partial rotations of the control wheel as the trailer pivots with respect to the tractor during a vehicle turn. As shown in FIGS. 4 and 5, an electronic counting mechanism 120 is attached to slider block 106. Counter 120 is configured to count the rotations or partial rotations of wheel 58. Counter 120 also can sense whether the vehicle is turning right or left. Counter 120 senses a right turn as positive counts, and a left turn as negative counts. Alternatively, wheel 58 can be fixed to a rotating axle 116, in which case counter 120 can be configured to count the rotations or partial rotations of axle 116. The number of rotations are translated into counts, which are transmitted via wires 96 to the system processor, described below.

In accordance with the second embodiment of the invention, the control wheel is movable away from the bottom surface of the trailer when the trailer is disengaged from the chassis of the tractor. As shown in FIG. 3, a release lever 130 is provided with fifth wheel 18 for releasing the engagement between trailer 14 and tractor 12. Preferably, a second release lever 132 is attachable to the fifth wheel release lever 130. Release lever 132 in turn attaches to a shaft 134, which is coupled to a rotating cam 136 on mounting block 100. A cable 138 extends between cam 136 and a cable set screw 140 bolted to slider block 106. When the driver operates the fifth wheel release lever 130, second release lever 132 turns shaft 134, which rotates cam 136. Rotation of cam 136 pulls cable 138, which in turn applies a downward force to slider block 106 against the upward bias of coil springs 110. The downward pull of cable 138 slides slider block downward along groove 104, thereby disengaging control wheel 58 from trailer 14, and moving control wheel 58 down away from trailer 14. This sequence functions to move the control wheel 58 clear of trailer 14, thereby avoiding the possibility of being damaged daring disengagement of trailer 14 from tractor 12.

The above-described embodiment provides for sliding movement of slider block 106 in groove 104 of mounting block 100. To assist this sliding movement, a lubricant such as graphite may be inserted into groove 104. It would also be within the scope of the invention to provide bearings or wheels between slider block 106 and groove 104, to create a rolling motion. Whether a sliding motion, a rolling motion, or a pivoting motion is provided is irrelevant, as long as a structure is provided that is capable of moving control wheel 58 into and out of engagement with the bottom surface of trailer 14.

Figure 6:
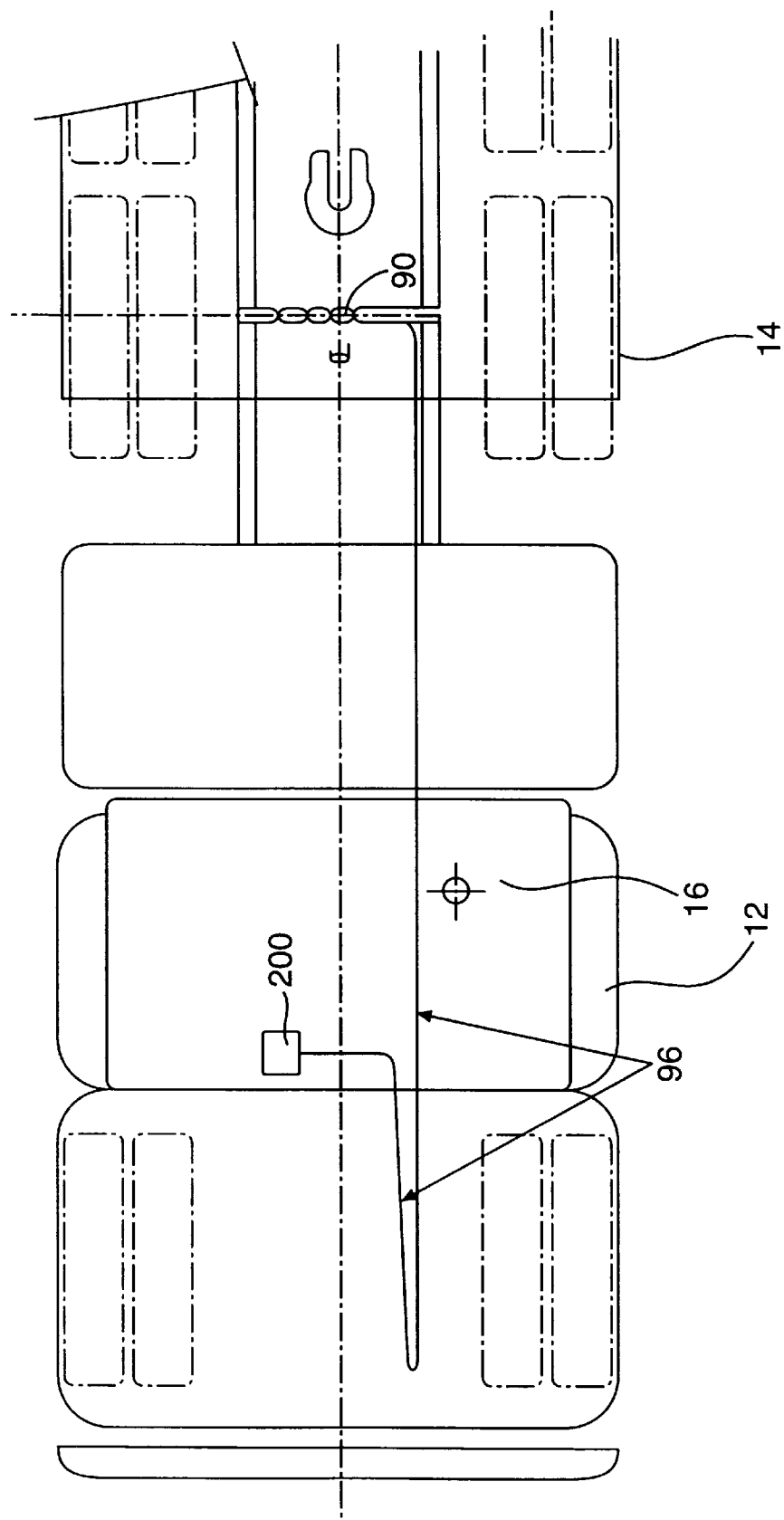
FIG. 6 is a top view of a trailered vehicle depicting portions of the jackknife warning system of the present invention.

As broadly depicted in FIGS. 4 and 6, electronic counter 90, or alternatively, electronic counter 120, is connected electrically to processor 200 (described below) with wire 96 mounted in the chassis 16 and running into the tractor 12. Electronic pulses from counter 90 or 120 travel via wire 96 to the processor. Although a wire is shown and described, other modes of transmitting a signal from the counter 90 or counter 120 to the processor also are contemplated and fall within the scope of the invention. For example, a fiber optic cable, a radio transmitter, or other modes of signal transmission can be used.

Figure 7:
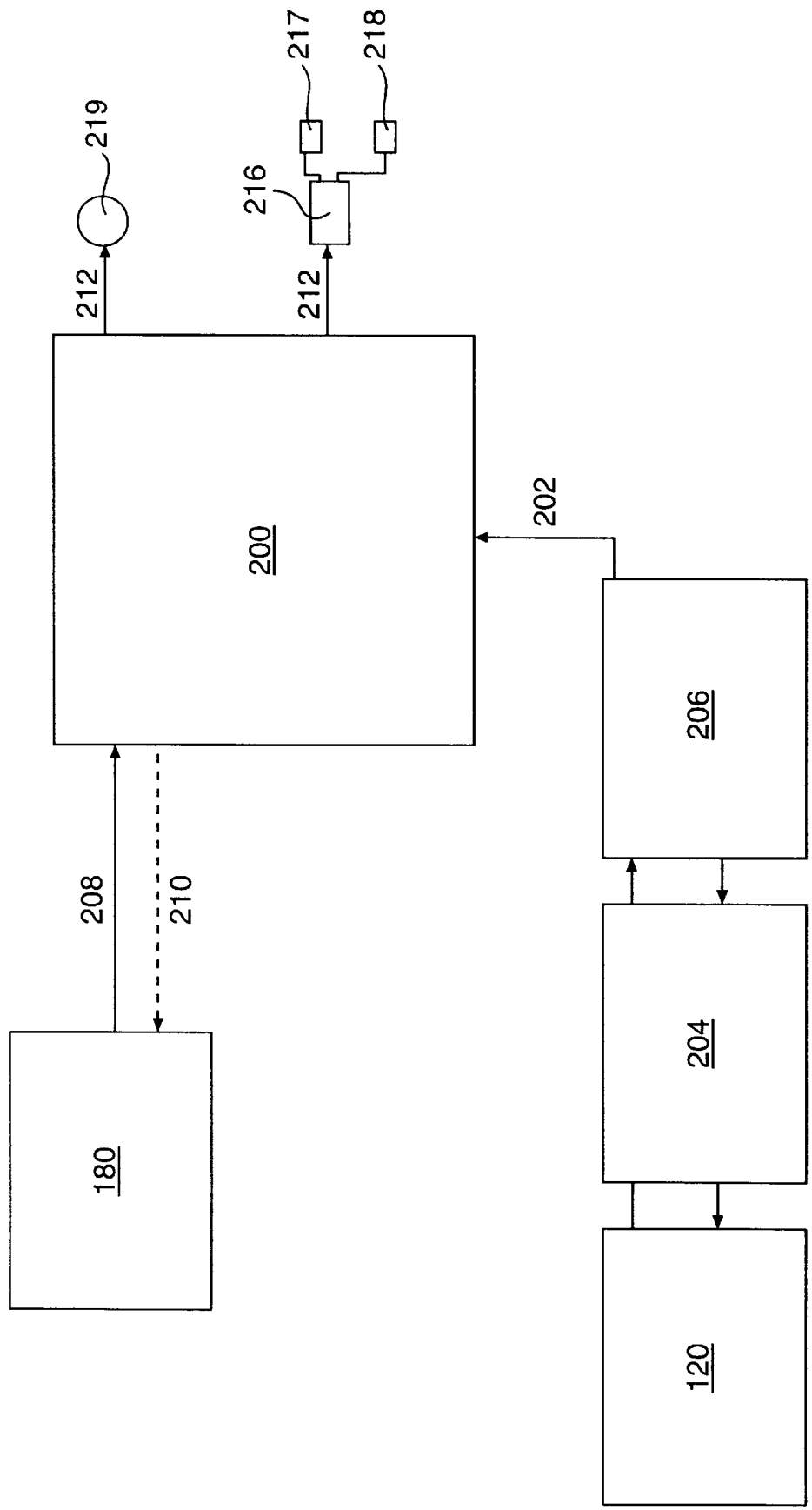
FIG. 7 is a schematic block diagram of the jackknife warning system of the present invention.

In accordance with the invention, a pressure sensor senses a pressure applied to the brakes of the vehicle. Referring to FIGS. 1 and 7, a pressure sensor 180 is provided, preferably branching from brake line 182. When pneumatic brakes are used, pressure sensor 180 can branch off of brake line 182 between compressor 189 and brakes 20. Alternatively, if a vehicle uses hydraulic brakes, pressure sensor 180 can branch from brake line 182 between the brakes 20 and the master cylinder.

The sensor 180 generates a signal 208 in response to brake pressure reaching a predetermined setpoint. Preferably, the brake pressure setpoint is manually adjustable. The driver must be able to adjust the brake pressure setpoint based on differing loads, or on differing road conditions. It is further preferred that the setpoint be adjustable automatically after each predetermined number of brake applications. The sensor 180 can be any commercially available sensor capable of sensing pressure. A preferred sensor is the IPS-22 Indicating Pressure Switch manufactured by Span Instruments.

In accordance with the invention, a controller is provided, programmed to generate an alarm signal when rotation of the trailer with respect to the tractor reaches a predetermined setpoint. As shown in FIG. 7, controller 200 receives a signal from encoder 120 (or 90) indicative of the rotation of trailer 14 with respect to tractor 12. The trailer rotation signal 202 is transmitted via cable 96 from encoder 120 via decoder 204, and 12 bit up/down counter 206. Controller 200 is programmed with an upper setpoint of trailer 14 rotation, preferably 4°, with respect to tractor 12.

Controller 200 also receives brake pressure signal 208 when brake pressure exceeds the predetermined pressure setpoint discussed above. As shown in FIG. 7, controller 200 also is programmed to transmit automatic adjustment signal 210 to brake pressure sensor 180. Adjustment signal 210 can be manually generated by the driver at a console mounted in the cab of tractor 12, or it can be automatically generated by controller 200 after a predetermined number of brake applications.

When trailer rotation reaches the upper rotation setpoint, an alarm signal 212 is generated by controller 200. Controller 200 also senses from the encoder 120 (or 90) whether the trailer is turning to the right (positive counts) or to the left (negative counts) in order to generate a right jackknife signal 212' or a left jackknife signal 212". Alarm signal 212 (i.e., 212' or 212") is transmitted to both a visual alarm 214 mounted in the cab, and an audible alarm 216, preferably a speaker unit mounted in the cab. The alarms alert the driver to a possible jackknife condition. Preferably, there is a right speaker 217 and a left speaker 218. Either the right speaker 217 or left speaker 218 alarm, depending on if the truck is jackknifing to the right or left, i.e., whether alarm signal 212 includes right jackknife signal 212' or left jackknife signal 212".

In the above-described embodiment, alarm signal 212, comprising either right alarm signal 212' or left alarm signal 212", is generated when rotation of the trailer with respect to the tractor reaches a predetermined setpoint to the right or left. In another embodiment of the invention, controller 200 can be programmed to generate alarm signal 212 (i.e., 212' or 212") only when both the high brake pressure signal 208 and the high trailer rotation signal 202 are received. In other words, in this embodiment, the alarms are generated by the combination of excessive rotation of the trailer with respect to the tractor, combined with an excessive brake pressure applied to the vehicle brakes. Once again, the alarms alert the driver to a possible jackknife condition.

Moreover, controller 200 also can be programmed to transmit signal 212 to visual alarm 214 only upon receipt of high brake pressure signal 208.

The above-described jackknife warning system gives the driver visual and audible alarms, alerting him to the existence of a jackknife condition, based on over-rotation of the tractor, possibly in combination with an over-application of pressure to the vehicle brakes. The alarms alert the driver to reduce pressure in the brake pedal, attempt to straighten the vehicle, or take other measures to prevent jackknifing.

Additional advantages and modifications will readily occur to persons skilled in the art. The invention in its broader aspects is not limited to the specific details described above. Departures may be made from such details without departing from the spirit or scope of the invention. The invention is limited only by the attached claims and their legal equivalents.

What is claimed is:

1. A jackknife warning system for a vehicle including a tractor and a trailer, the system comprising:
   a trailer-turning sensor, comprising a rotatable control wheel, a wheel support apparatus attachable to a chassis of the tractor supporting the rotatable control wheel and configured to move the control wheel into rolling engagement with a bottom surface of the trailer, and a counter operable to count a number of rotations or partial rotations of the control wheel as the trailer pivots with respect to the tractor during a vehicle turn;
   an electronic controller programmed to receive the number of wheel rotations or partial rotations from the counter, calculate a degree of trailer rotation with respect to the tractor corresponding to the number of wheel rotations or partial rotations, and to generate an alarm signal when the degree of rotation of the trailer with respect to the tractor reaches a first setpoint; and
   an alarm device for emitting an alarm in response to the alarm signal.

2. The system of claim 1, further comprising a pressure sensor sensing a pressure applied to a set of brakes for the vehicle, wherein the controller emits the alarm signal when rotation of the trailer reaches the first setpoint and the pressure applied to the brakes reaches a second setpoint.

3. The system of claim 1, when the wheel support apparatus includes a mounting block having a groove defined therein and a support movably engaged in the groove rotatably supporting the control wheel.

4. The system of claim 1, wherein the wheel support apparatus includes an arm that is pivotably attachable to the chassis of the tractor rotatably supporting the control wheel.

5. The system of claim 1, wherein the trailer-turning sensor is electronically connected to the controller.

6. A jackknife warning system for a vehicle including a tractor and a trailer, the system comprising:
   a trailer-turning sensor, attachable to a chassis of the tractor and engageable with the trailer, capable of sensing rotation of the trailer with respect to the trailer;
   a controller programmed to generate an alarm signal when rotation of the trailer with respect to the tractor reaches a first setpoint; and
   an alarm device for emitting an alarm in response to the alarm signal;
   wherein the trailer-turning sensor includes a wheel maintained in rolling engagement with an underside of the trailer which is electronically connected to the controller, and wherein the trailer-turning sensor further includes an encoder converting rotations or partial rotations of the wheel into counts, and transmits the counts to the controller.

7. The system of claim 1, wherein the first setpoint is set to correspond to the trailing turning approximately 4° with respect to the tractor.

8. The system of claim 2, wherein the second setpoint is adjustable.

9. The system of claim 8, wherein the second setpoint is automatically adjustable after a preselected number of vehicle stops.

10. The system of claim 1, wherein the alarm device includes an audible alarm portion.

11. The system of claim 1, wherein the alarm device includes a visual alarm portion.

12. The system of claim 2, wherein the alarm device includes a visual alarm portion for providing a visual alarm when the pressure applied to the brakes reaches the second setpoint.

13. A jackknife warning system for a vehicle including a tractor and a trailer, comprising:
   a trailer-turning sensor, attachable to a chassis of the tractor and engageable with the trailer, capable of sensing rotation of the trailer with respect to the tractor;
   a pressure sensor sensing a pressure applied to a set of brakes for the vehicle;
   a controller programmed to generate an alarm signal when the rotation of the trailer with respect to the tractor reaches a first setpoint and the pressure applied to the brakes reaches a second setpoint; and
   an alarm device for emitting an alarm in response to the alarm signal.

14. The system of claims 1 or 13, wherein the trailer turning sensor senses rotation of the trailer with respect to the tractor both to the right and to the left.

15. The system of claims 1 or 13, wherein the controller generates a right alarm signal or a left alarm signal, depending on whether rotation of the trailer with respect to the tractor reaches a first setpoint to the right or to the left.

16. The system of claims 1 or 13, wherein the alarm device emits a right alarm or a left alarm, depending on whether rotation of the trailer with respect to the tractor is to the right or to the left.

* * * * *